United States Patent Office 2,914,756
Patented Nov. 24, 1959

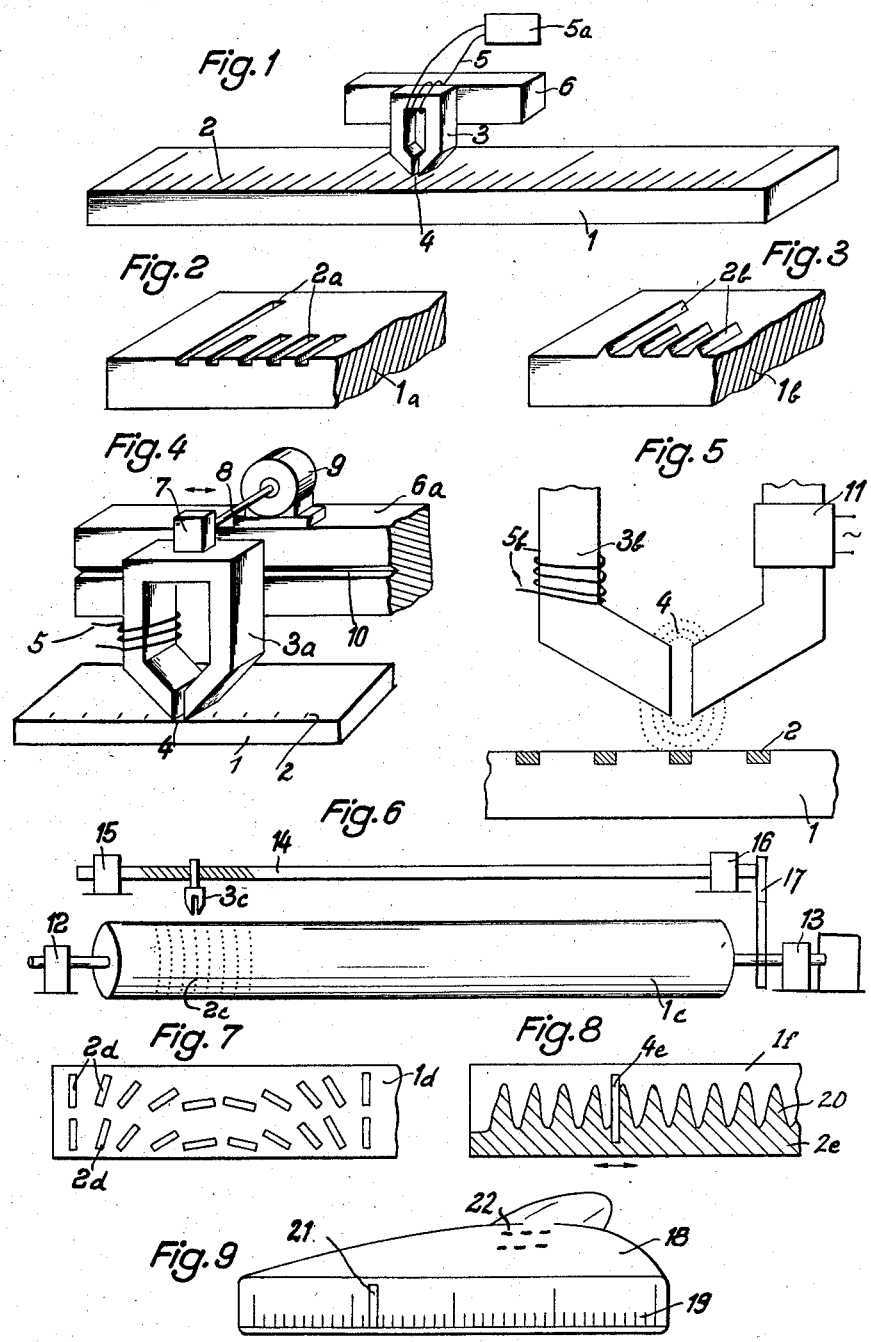

2,914,756

MEASURING APPARATUS COMPRISING A GRADUATED SCALE

Johannes Heidenhain, Traunreut, Upper Bavaria, and Irmfried Kirstaedter, Berlin-Schlachtensee, Germany Application January 21, 1954, Serial No. 447,856

Claims priority, application Germany January 21, 1953

5 Claims. (Cl. 340—316)

(Filed under Rule 47(a) and 35 U.S.C. 116)

The present invention refers to an apparatus for determining the movement of a movable element along a series of indications, and more particularly to an apparatus for determining and indicating the movement of a movable element along a graduated scale.

In many technical fields it is necessary to determine at a remote point the position of a movable element with respect to a series of indications such as a graduated scale. For instance, computing machines and machine tools require frequently a remote indication. In computing machines a rotary or rectilinear movement of movable elements has to be indicated at a remote control station in order to be read by the operator. In machine tools, movable parts move along a graduated scale and it is frequently required to stop such movement at a predetermined very exactly defined point, or to control the movement of the movable element at a predetermined point.

In the known arrangements for solving this problem, electrical sensing contacts or photocells are provided for transforming structural or optical indications and graduations of the scale into electric impulses which can be observed at a control station in the form of visible or audible signals.

It is one object of the present invention to overcome certain disadvantages of the known constructions, and to provide an apparatus for determining and indicating by means of magnetic impulses a movement of a movable element along a graduated scale.

It is another object of the present invention to provide a graduated scale having magnetizable or magnetic portions arranged spaced from each other, and to connect a movable member whose movement is to be checked to an electro-magnetic sensing member cooperating with the graduated scale.

It is a further object of the present invention to provide a graduated helical scale having graduations consisting of a magnetic material so that the electromagnetic sensing member cooperates with comparatively widely spaced graduations or indications.

With these objects in view the present invention mainly consists in an apparatus for determining the movement of a movable element relative to a series of indications, in combination, two indicating members, one of the indicating members being a scale carrier and having at least one set of magnetic portions arranged spaced from each other in one direction to define a series of indications, and the other of the indicating members being an electro-magnetic sensing means adapted to receive an impulse during relative movement between the electro-magnetic sensing means and each of the magnetic portions, at least one of the two indicating members being movable in at least the one direction relative to the other of the two indicating members.

According to one embodiment of the present invention the set of indications consists of a series of lines arranged on a magnetizable carrier to form a graduated scale which extends in the direction of the relative movement of the indicating member. The carrier of the graduated scale can also consist of a non-magnetic material into which a magnetizable substance is embedded. The carrier may also consist of a non-magnetic material on which the graduated scale is produced by inserts or surface layers of a magnetizable material. On the other hand it is also contemplated to make the carrier of a magnetizable material and to provide non-magnetic graduations separated by magnetic portions.

According to another embodiment of the present invention the entire carrier including its graduation consists of a magnetic or magnetizable material, and the graduated scale is formed of projections or notches which are capable of producing voltage impulses in a magnetic sensing means passing over the carrier.

The apparatus according to the present invention cooperates with an optical or acoustic indicator which transforms the electric impulses received by the electromagnetic sensing means into indications which may be observed at a remote control station. In order to distinguish the impulses received by the control station, preferably an electric counting mechanism or totalizer counts the impulses received from the electro-magnetic sensing means while the same passes over the impulse producing magnetized portions of the indicating member carrying the scale. In that manner it can be determined at the control station at any moment at what graduation the sensing member is located.

It is, however, also contemplated to provide indications on the graduated scale which differ from each other in length, width, position, degree of produced magnetic force, or differ by a combination of the above mentioned properties. Such changes of the properties of consecutive graduations may be periodically repeated, while special indications indicate the beginning and end of consecutive series and may serve as a coarse graduation of a higher denominational order.

The voltage induced in the magnetic sensing member depends on the relative speed between the magnetized carrier portion and the electro-magnetic sensing member. It is desirable that a sufficiently high voltage is induced in the sensing member even if the relative speed is very small, or if the movable member has stopped. According to the present invention means are provided for producing an adequate induced voltage even under such conditions.

According to one embodiment of the present invention one of the two indicating members is caused to oscillate mechanically in a direction transverse or perpendicular to its movement along the other indicating member.

Such mechanical oscillation can also take place in the direction of the graduated scale so that at least one of the indicating members performs in addition to its movement along the scale also an oscillating movement in the same direction. In this event the amplitude of the oscillation has preferably such extent as to correspond at least to the sum of the width of the magnetic indication in the direction of the movement of the movable indicating member and of the width of the gap of the electro magnetic sensing means. In the event that the mechanical oscillation takes place in a direction transverse to the direction of relative movement between the indicating members, the smallest possible amplitude is chosen for the oscillation which must be sufficient to produce sufficiently great differences in the magnetic field.

The frequency of the oscillation of the oscillated indicating member is preferably 50 to 60 cycles per second so that available alternating current may be used for producing the mechanical oscillation by electro-magnetic or electro-dynamic means.

The additional oscillation may also be produced by an oscillatable member which is arranged between the two indicating members. For instance, a small iron tongue may be provided which is caused to oscillate at a frequency of 50 cycles per second.

It is also contemplated to provide on the electromagnetic sensing means an auxiliary winding which is connected to a source of alternating current so that in the core of the electro-magnetic sensing means an alternating bias magnetization is produced which is modulated by the field variations produced in the electro-magnetic sensing means by the magnetized portions of the graduated indicating member.

The problem of producing a sufficiently great induced voltage in the electromagnetic sensing means in spite of a very slow relative movement between the same and the carrier of the magnetized indications can also be solved by extending the length of the graduated scale. According to an embodiment of the present invention the carrier of the graduated scale is cylindrical, and the graduated scale is a helix consisting of spaced magnetic indications.

A series of indications which move at a sufficient speed relative to the electro-magnetic sensing means, particularly a series of indications arranged along a helix, is suited for providing an indication of the position of the indicating members by audible signals. Along the series of indications constituting the graduated scale, a magnetic sound track is recorded which may be transformed into a spoken indication of the graduations. It is particularly advantageous to simultaneously record audible signals whose ends indicate the exact position of the scale indication. Similar to a radio time signal the next following number of the graduations is announced, whereupon a signal is sounded whose end coincides with a graduation located opposite the sensing member.

In the event that a spoken announcement is to take place together with differentiated indicating impulses, it is advantageous to separate the frequency bands for the two ranges of transmission, for instance by setting apart for the announcements a band between 300 and 3,000 cycles per second, and to reserve for the signals frequencies above or below this range of frequency.

According to another embodiment of the present invention the consecutive graduations of the scale can be differentiated in the following manner. It is known that a magnetic sensing means having a gap produces a full induced voltage only if its gap coincides with the direction of an elongated narrow magnetic indication. Consequently, according to the present invention magnetic graduation lines are formed on a carrier which are inclined at different angles with respect to the relative movement between the carrier and the sensing means, or in other words are inclined to the main direction of the graduated scale. If for instance, a series of ten differently inclined indications is provided which cooperate with ten electro-magnetic sensing members having correspondingly inclined air gaps, in each relative position between the carrier of the graduated scale and the electro-magnetic sensing means, only one electro-magnetic sensing member will have an air gap coinciding with one of the graduations. It is only in this sensing member that a full voltage is induced so that the position of the indicating members relative to each other can be determined. It is contemplated to arrange, for instance, three series of inclined indications beside each other, and in this event $10^3$ different combinations can be formed.

According to another embodiment of the present invention two graduated scales consisting of magnetic indications are provided which are graduated in the manner of a Vernier scale. By means of two electro-magnetic sensing devices the respective position can be ascertained with an accuracy ten times as great as by means of a single graduated scale.

Particularly, combined with a Vernier scale arrangement, but also in combination with other embodiments of the invention, it is advantageous to provide instead of lines, dots, etc. as a graduated scale a periodically varying indication, such as a sinus curve. The extension, intensity, or amplitude may continuously change.

The electrical impulses produced and transmitted by the electro-magnetic sensing means are received by a control station, and may be reproduced optically, acoustically, graphically, or in a combined manner. For the optical indication an electron beam is particularly suitable which is controlled by an alternating current and oscillates along a linear scale. The electric impulses received from the sensing means deflect the beams in a direction transverse to its oscillating direction so that the position is visually indicated on the graduated scale.

In all described embodiments of the present invention means are provided for determining consecutive sections of the scale. For instance a means will be provided for indicating 100 graduations within 10 mm., and other means for indicating 10 mm. graduations within each 1,000 mm. Frequently it is advantageous to provide optical means for indicating the fine graduations, and acoustic means for indicating the coarse graduations of a higher decimal order by announcement or by a sound signal having a predetermined frequency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an isometric schematic view illustrating the general arrangement of the present invention;

Figs. 2 and 3 are fragmentary isometric views of details of two modified embodiments of the present invention;

Fig. 4 is a fragmentary isometric view illustrating an embodiment of the present invention;

Fig. 5 is a fragmentary side elevation of a modified embodiment of the present invention;

Fig. 6 is a schematic isometric view of a preferred embodiment of the present invention;

Fig. 7 is a fragmentary plan view of a detail of the embodiment of the present invention in which consecutive indications are differently inclined;

Fig. 8 is a plan view of a detail of an embodiment of the present invention in which sinus-shaped indications are provided;

Fig. 9 is an isometric view of an electron tube for indicating impulses by a deflected electron beam.

Figure 10A:
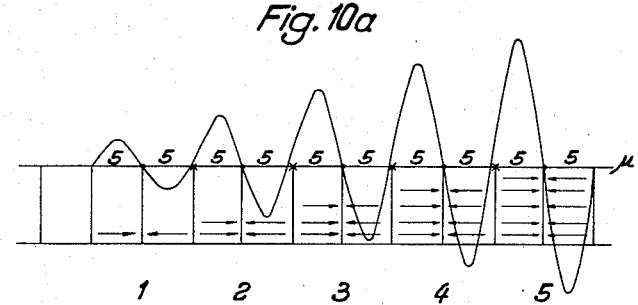
Figs. 10, $a$, $b$, $c$ and $d$ diametrically illustrate an arrangement of indications according to a modified embodiment of the present invention.

Referring now to the drawings, and more particularly to Fig. 1, two indicating members 1, 3 are shown, the indicating member 1 being a scale carrier provided with magnetic indications 2 which form a graduated scale. The indicating member 3 is an electro-magnetic sensing means having an air gap 4 extending in the same direction as the graduation lines 2. The electro-magnetic sensing means 3 includes a winding 5 and a support 6.

When the indicating member 3 and 1 are moved relative to each other in the direction of the graduated scale, electrical impulses are produced in the winding 5 which are transmitted to suitable indicating means 5a. The air gap has preferably a width of less than 10 microns. The indicating means 5a preferably include a totalizer.

In the embodiment shown in Fig. 2 the carrier of the graduated scale consists of a non-magnetic material which is formed with spaced grooves 2a into which members consisting of magnetic material are inserted. This arrangement produces strong magnetic fields which are particularly unsensitive against field variations, as for instance may occur in connection with the embodiment shown in Fig. 5.

In the embodiment shown in Fig. 3, the graduations of the graduated scale are pointed projections 2b. It will be appreciated that relative movement between an electro-magnetic sensing means and the magnetic projections 2b will produce an induced voltage in the winding of the sensing means.

Referring now to Fig. 4, the electro-magnetic sensing means 3a is oscillatable in the direction of its main movement along the graduated scale 2. On the support 6a, a motor 9 is mounted which turns an eccentric rod 8 whereby the member 7 and thereby the electro-magnetic sensing means 3 are oscillated. Due to the oscillation of the sensing means 3a over each graduation which takes place at a comparatively high speed, strong impulses are produced in the winding 5, although the relative movement between the indicating member 3a and 1 may be very slow. Transverse oscillations are produced in a similar manner.

Fig. 5 illustrates an electro-magnetic sensing means 3b which is provided with an auxiliary winding 11 supplied by alternating current having a frequency of 50 cycles per second. Consequently, even if there is no relative movement between the magnet portions 2 and the air gap 4, an impulse is created in the winding 5b of the electro-magnetic sensing means 3b when the air gap is located opposite a magnetic scale portion.

Fig. 6 illustrates an embodiment of the present invention according to which a cylindrical carrier 1c is provided with a helical graduated scale 2c. The cylindrical carrier 1c is rotatably mounted in bearings 12, 13. The electro-magnetic sensing means 3c is mounted on a threaded spindle 14 which is turnably mounted in bearings 15 and 16 and connected for rotation to the cylinder 1c by a transmission means 17 having a suitable ratio. The cylindrical member 1c is connected to a movable element and rotates at a speed corresponding to the speed of the movable element which is to be controlled. During simultaneous rotation of the members 14 and 1c, the electro-magnetic sensing means 3c moves along the helix 2c. The advantage of this construction will be best understood with reference to the following example:

In the event that the carrier of the straight graduated scale moves at a linear speed of 30 mm. per second, the sensing of two indications which are spaced 10 microns must be carried out in the very short time period of 1/3,000 of a second. In the event, however, that the graduated scale is a helix on a cylindrical carrier having a diameter of 100 mm., and having a pitch of 30 mm., within one second, and at the same longitudinal speed as in the previous example, a graduated scale having a length 100 times 100.π that is more than 3,000 mm. moves past the sensing means so that the accuracy is increased a hundred times.

Referring now to Fig. 7, the carrier 1d is provided with two series of indications 2d. Each series of indications consists of ten magnetic lines which are arranged at varying angles with respect to the longitudinal extension of the carrier 1b which is also in the direction of relative movement between the carrier and electromagnetic sensing means. In this embodiment the sensing means include ten electro-magnetic sensing members for each series of indications, each sensing member having an air gap inclined in the same direction as one of the magnetic indications 2d. During relative movement between the sensing means and the carrier, only the electro-magnetic sensing member will receive an impulse whose air gap has the same direction as the magnetic indication line located opposite it so that the position of the entire sensing means can be determined at a remote control station. In the arrangement illustrated in Fig. 7 two series of indicating magnetic lines are illustrated. This arrangement permits a combination of the signals so that $10^2$ distinguishable signals can be transmitted. In the event that three series of magnetic indications having different inclinations are provided, $10^3$ signals can be differentiated.

In the embodiment shown in Fig. 8, the indications have an area bounded by a periodical line such as a sinus curve. The sinus curve 20 separates the magnetic surface portion 2e from the non-magnetic surface portion 1f. When the air gap 4e of an electro-magnetic sensing means moves in the direction of the arrow over the series of indications, it is possible to determine at any moment the relative position of the air gap 4e and line 20, since the induced voltage constitutes an exact measure of the transverse extension of the magnetized portion 2e.

A second periodical indication may be provided having a frequency which is only one-tenth of the frequency of the curve 20.

Fig. 9 illustrates an arrangement for optically indicating impulses received and transmitted by the electromagnetic sensing means. An electronic tube 18 produces an electron beam which oscillates along a graduated scale 19. When the electron beam is deflected means 22 due to magnetic impulses received from the electro-magnetic sensing means, the beam moves in a transverse direction as illustrated at 21. In the event that the oscillation of the beam along the scale 16 takes place at a speed, and frequency, respectively, which is dependent on the movement of the carrier of the graduated magnetic scale, the points at which the beam deflections take place are an indication of the positions of the sensing means relative to the indications of the graduated scale.

It is advantageous to provide several scales in different denominational orders for coarse and fine graduations. In this event an electronic tube producing a plurality of beams is used, each beam oscillating along an associated scale.

Figure 10D:
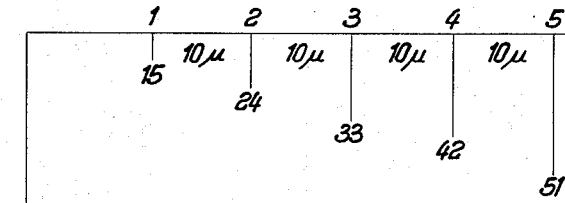
Figure 10B:
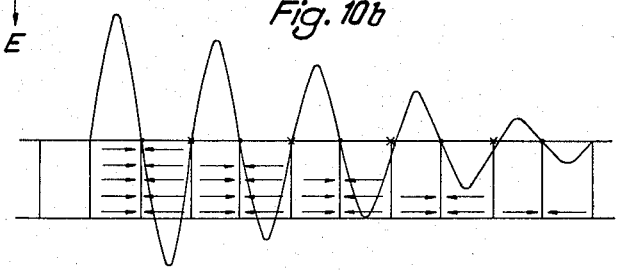
Figure 10C:
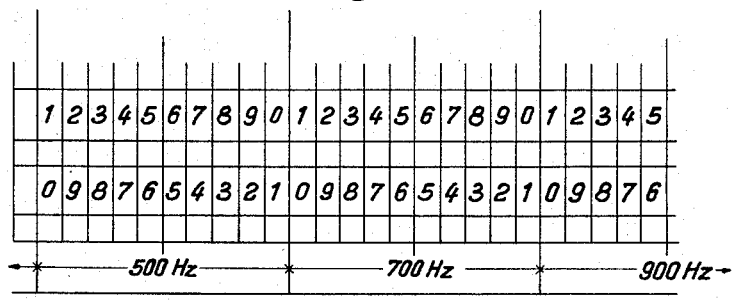

Figs. 10 a to d illustrate diagrammatically the arrangement of a series of indications permitting a fine differentiation between particularly closely spaced indications. Assuming an accuracy in the magnitude of only a few microns is required, magnetic lines are produced at distances of 10 microns by means of an electro-magnet having an air gap of 5 microns. The field directions of adjacent magnetic lines are reversed so that the intensity increases step-wise as indicated by the arrows in the diagram 10a. On a second adjacent and parallel track which is shown in Fig. 10b, a similar series of indications is produced which have an intensity decreasing in the direction of increased intensity in Fig. 10a. When the tracks are sensed by a corresponding pair of oscillating electro-magnetic sensing means, and the produced electric voltages are rectified, the differences between the two voltages are indication of the corresponding location of the electro-magnetic sensing means. In this manner, a decade system can be again formed, if for instance the magnetic force of the individual indications differs 5 db so that the entire force is 50 db. For distinguishing the individual decades, sound signals may be arranged on a further track which have a frequency changing in each decimal order, or sound tracks may be provided which announces the positions as illustrated in Fig. 10c.

It will be understood that each of the elements described above, or two or more together, may also find a useful application in other types of apparatus for determining the movement of a movable element relative to a series of magnetic indications differing from the types described above.

While the invention has been illustrated and described as embodied in an apparatus comprising a carrier having a graduated scale consisting of magnetic graduations and electro-magnetic sensing means cooperating with said scale carrier to receive impulses from said magnetic graduations, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a measuring apparatus, in combination, a graduated scale means including a rigid carrier and indication line means, said carrier and said indication line means producing different permanent magnetic flux patterns; electromagnetic sensing means adapted to receive impulses from said perminent flux patterns during relative movement between said scale means and said sensing means; means for producing relative movement between said scale means and said sensing means; and oscillating means for oscillating said electromagnetic sensing means so that the same receives strong impulses during relative movement between said scale means and sensing means regardless of the relative speed of relative movement.

2. In a measuring apparatus, in combination, a graduated scale means including a rigid carrier and indication line means, said carrier and said indication line means producing different permanent magnetic flux patterns; electromagnetic sensing means adapted to receive impulses from said permanent flux patterns during relative movement between said scale means and said sensing means; means for producing relative movement between said scale means and said sensing means; and oscillating means for oscillating said electromagnetic sensing means in a direction transverse to the direction of relative movement so that the same receives strong impulses during relative movement between said scale means and sensing means regardless of the relative speed of relative movement.

3. In a measuring apparatus, in combination, a graduated scale means including a rigid carrier and indication line means, said carrier and said indication line means producing different permanent magnetic flux patterns; electromagnetic sensing means adapted to receive impulses from said permanent flux patterns during relative movement between said scale means and said sensing means; means for producing relative movement between said scale means and said sensing means; and oscillating means for oscillating said electromagnetic sensing means in the direction of relative movement so that the same receives strong impulses during relative movement between said scale means and sensing means regardless of the relative speed of relative movement.

4. In a measuring apparatus, in combination, a graduated scale means including a rigid carrier and a set of indication line means, said carrier and said indication line means producing different permanent magnetic flux patterns, each of said indication line means extending at different angles with respect to one direction; electromagnetic sensing means including a set of electromagnetic sensing members, each of said sensing members having a core defining an air gap, said air gaps being arranged at different angles with respect to said one direction, each of said air gaps extending in the direction of one of said indication line means, said sensing means being adapted to receive impulses during relative movement between said scale means and said sensing means; means for oscillating said sensing members relative to said scale means; and means for producing relative movement between said scale means and said sensing means.

5. In a measuring apparatus, in combination, graduated scale means including a rigid carrier and indication line means, said carrier and said indication line means producing different permanent magnetic flux patterns; electromagnetic sensing means including a core having an air gap and a winding on said core, said winding being adapted to receive impulses from said permanent flux patterns during relative movement between said scale means and said sensing means; means for oscillating said sensing means relative to said scale means; means for producing relative movement between said sensing means and said scale means; an electron beam producing means; a graduated scale associated with said electron beam producing means; means for oscillating the electron beam produced by said electron beam producing means along said graduated scale; a circuit connected to said winding; and beam deflecting means in said circuit controlled by impulses received by said winding to deflect said electron beam in a direction transverse to the direction of oscillation of said beam for indicating said impulses on said graduated scale.

References Cited in the file of this patent

UNITED STATES PATENTS

| 1,074,424 | Fessenden | Sept. 30, 1913 |
| 2,165,307 | Skellett | July 11, 1939 |
| 2,429,236 | Potter | Oct. 21, 1947 |
| 2,540,654 | Cohen et al. | Feb. 6, 1951 |
| 2,547,009 | Huston | Apr. 3, 1951 |
| 2,579,831 | Keinath | Dec. 25, 1951 |
| 2,588,102 | Forero | Mar. 4, 1952 |
| 2,590,091 | Devol | Mar. 25, 1952 |
| 2,597,866 | Gridley | May 27, 1952 |
| 2,608,621 | Peterson | Aug. 26, 1952 |
| 2,611,813 | Sharpless | Sept. 23, 1952 |
| 2,625,607 | Eckert | Jan. 13, 1953 |
| 2,628,539 | De Neergard | Feb. 17, 1953 |
| 2,628,689 | Rieber | Feb. 17, 1953 |
| 2,681,387 | Roys | June 15, 1954 |
| 2,722,569 | Loper | Nov. 1, 1955 |
| 2,740,952 | Jacobs | Apr. 3, 1956 |

FOREIGN PATENTS

| 134,018 | Great Britain | Oct. 22, 1919 |